Patented Dec. 8, 1942

2,304,678

UNITED STATES PATENT OFFICE 2,304,678

RUBBER CEMENT AND METHOD OF MAKING THE SAME

Russell J. Bush, Wabash, Ind., assignor to The General Tire & Rubber Company, Akron, Ohio, a corporation of Ohio No Drawing. Application September 1, 1939, Serial No. 293,103

4 Claims. (Cl. 260—739)

This invention relates to adhesive unmasticated rubber solutions and to a method of preparing the same. It particularly relates to quick drying rubber cements having relatively high tensile strength such as that of unmasticated rubber.

Cements prepared from latex have low viscosity and produce films having comparatively high strength and superior aging properties. Being aqueous dispersions, however, latex cements are disadvantageous and are often unsuitable because of the long time required for drying. It is, therefore, desirable to produce rubber cement having the film strength of the rubber in latex and having the comparatively short drying time obtained with cements having rubber dissolved in petroleum rubber solvents, etc.

Rapid drying cements containing unmasticated rubber dissolved in volatile solvents have heretofore been produced by intimately mixing latex with an aqueous emulsion of a rubber solvent and then adding a coagulant such as alcohol or the like. In the preparation of such cements, however, a considerable portion of an emulsifying agent, soap, etc., has been used in order to prepare an aqueous dispersion of the rubber solvent and it has been found that such colloid, of which ammonium oleate is an example, adversely affects the tackiness of the cement so that its adhesive properties are substantially decreased.

It is an object of this invention to provide quick drying cements made from unmasticated rubber and having high adhesive properties and a high degree of tackiness when wet.

It is a further object of this invention to provide a method of making rubber cements having high tensile strength, wherein rubber latex and a rubber solvent are combined together without the addition of a protective colloid or an emulsifying agent.

It is a further object of this invention to provide a method of making a quick drying rubber cement from rubber latex and a rubber solvent, which is not miscible with water, without preparing an aqueous emulsion of the rubber solvent.

It is a still further object of this invention to provide a rubber cement having rubber latex and a rubber solvent and having the water of the latex or added water intimately dispersed throughout the whole mass without adding a soap or colloid material.

According to the present invention rubber cements are formed by adding a rubber solvent to a rubber latex of suitable concentration without any definite attempt to distribute the two materials in each other. The unemulsified solvent and the latex may be incorporated in a suitable container and even though there is some agitation of the ingredients, distinct layers of the two ingredients will be maintained because of their immiscibility. A small amount of a liquid, such as acetone, which is miscible with or soluble in both liquids, is then added to the container. This liquid acts as a carrier of the rubber solvent into contact with the rubber particles through any aqueous films surrounding the latex particles so that a comparatively thick homogeneous rubber solution is produced almost instantly when the mixture is agitated. Since the rubber particles are in such a finely divided form they swell almost instantaneously upon contact with the solvent in the carrier liquid to entrap the water of the latex as a disperse phase and form a gel which is a homogeneous dispersion of water in the rubber solution.

The quantity and concentration of latex used may be varied to a considerable extent and depends upon the viscosity desired in the final mix and upon the quantity of water desired in the cement. With the more dilute latices a correspondingly larger proportion should be used to obtain cements of the same viscosity. The dilution of the latex with water should not be carried to such an extent that a continuous film is not formed however. Generally latices having more than 15% of rubber solids are preferred for most applications although latices having as low as about 10% of rubber solids may be used for the preparation of cement. The latex may be a concentrated latex or a natural latex with various preserving agents. It is preferred, however, to use a latex such as Revertex which is a latex concentrated by evaporation and preserved with an alkaline material such as sodium hydroxide, etc.

The solvent may be any of the common rubber solvents, such as naphtha, benzene, carbon tetrachloride, and the like, but petroleum rubber solvents are generally preferred because of the relatively low cost. The quantity of solvent used obviously depends upon the viscosity desired. When non-inflammable cement is desired a suitable portion of a solvent may be carbon tetrachloride or other non-inflammable rubber solvent.

The liquid used as the carrier liquid obviously depends upon the particular solvent used. It should in all cases be miscible with or soluble in both the water and the solvent used in preparation of the cement. The carrier liquid may either be a single chemical compound, such as acetone or alcohol, or a mixture of two, or more miscible or mutually soluble liquids, such as alcohol and carbon tetrachloride, alcohol and benzene, etc., at least one constituent which is miscible with or soluble in the rubber solvent and at least one of which is miscible with or soluble in the water of the latex. When carbon tetrachloride is used or benzene is used as a rubber solvent the alcohol alone will suffice as the carrier medium.

Since in the preparation of the cement as set forth, a protective colloid has not been added to the latex or to the rubber solvent, cements of superior tackiness are obtained. However, it has been found that the tackiness and adhesive properties may be still further increased by the addition of non-saponified tack producing materials, such as rosin, hydrogenated rosin, etc., to the cement. The unsaponified tack producing materials are preferred, as the usual saponified materials appear to be preferentially absorbed in the aqueous or disperse phase of the cement and are therefore less effective. The unsaponified materials preferably are those long chain acids or distillation residues containing a combined acid radical.

Although rosin is but sparingly soluble in petroleum solvents, the small amount added before saturation of the solvent occurs has been found to increase the tackiness of the cement substantially.

The rosin or other non-saponified tack producing material may be added if desired in finely pulverized form to the thick rubber gel described above, but it is preferably added in liquid form, dissolved in the rubber solvent before or after the solvent is added to the latex. The rosin may be present in sufficient quantities to saturate the solvent but it has been found that about 2 to 5% of rosin is desirable to produce a cement having superior properties.

The following examples illustrate the preparation of adhesive composition according to this invention.

*Example I*

Two gallons of a petroleum rubber solvent, such as a benzine, are added to 40 ounces of 60% latex in a suitable container. About ½ pint of acetone is then added and the product shaken to a substantial degree, whereupon a thick gel having high adhesive properties is produced. The acetone may if desired be mixed with the solvent prior to the addition of the latex.

When about 8 ounces of rosin is added to the solvent used in the preparation of the cement, the tackiness of the cement is improved and a cement having the property of adhering to leather with greater tenacity when wet is obtained.

*Example II*

A non-inflammable cement was prepared by adding ½ gallon of gasoline and 1½ gallons of carbon tetrachloride to 40 ounces of Revertex having a rubber concentration of about 60% rubber solids. One half pint of alcohol was added and the mixture shaken thoroughly whereupon a thick gel having rubber dispersed in the solvent as a continuous phase and containing the water of the latex in intimate association was obtained.

In the above experiment the acetone or alcohol may be substituted by other liquids which are miscible with the solvent and the water. It being understood, however, that when the carrier liquid material is not a rubber solvent the quantity added to the cement should be insufficient to prevent the solution of the rubber or salt out the rubber from the solvent.

The rubber latex in the above examples may be substituted by natural or artificial aqueous dispersions of rubber, balata, gutta percha or artificial aqueous dispersions of synthetic rubber, etc., to produce cements having divergent properties.

Any of the aforesaid dispersions may contain the usual compounding and vulcanizing ingredients in suitable concentration if desired.

Furthermore, it is to be understood that the particular methods and compounds disclosed and the procedure set forth are merely illustrative, and are presented for purposes of explanation and illustration, and that various equivalent compounds can be used without departing from the spirit of my invention.

What I claim is:

1. A method of preparing adhesive, unmasticated rubber cements having a continuous phase of rubber swollen by a rubber solvent, which comprises mixing an unemulsified rubber solvent derived from petroleum with a relatively small amount of a member of the group consisting of acetone and alcohols which are miscible with water and the rubber solvent, the amount of said group member used being insufficient to prevent solution of the rubber or to salt out the rubber from the solvent, and then incorporating the mixture in a rubber latex whereby a continuous phase of rubber swollen by solvent and a disperse phase of water are formed.

2. A method of preparing adhesive, unmasticated rubber cements having a continuous phase of rubber swollen by a rubber solvent, which comprises mixing an unemulsified rubber solvent derived from petroleum with a relatively small amount of an alcohol which is miscible with water and said rubber solvent, and then incorporating the mixture in a rubber latex whereby a continuous phase of rubber swollen by solvent and a disperse phase of water are formed, the amount of said alcohol used being insufficient to prevent solution of the rubber or to salt out the rubber from the solvent.

3. A method of preparing adhesive, unmasticated rubber cements having a continuous phase of rubber swollen by a rubber solvent, which comprises mixing an unemulsified rubber solvent derived from petroleum with a relatively small amount of ethyl alcohol which is miscible with water, and then incorporating the mixture in a rubber latex whereby a continuous phase of rubber swollen by solvent and a disperse phase of water are formed, the amount of said alcohol used being insufficient to prevent solution of the rubber or to salt out the rubber from the solvent.

4. A method of preparing adhesive, unmasticated rubber cements having a continuous phase of rubber swollen by a rubber solvent, which comprises mixing an unemulsified rubber solvent derived from petroleum with a relatively small amount of acetone which is miscible with water, and then incorporating the mixture in a rubber latex whereby a continuous phase of rubber swollen by solvent and a disperse phase of water are formed, the amount of said acetone used being insufficient to prevent solution of the rubber or to salt out the rubber from the solvent.

RUSSELL J. BUSH.